United States Patent
Jung

(10) Patent No.: US 10,689,028 B2
(45) Date of Patent: Jun. 23, 2020

(54) CONTROL APPARATUS AND METHOD OF MOTOR-DRIVEN POWER STEERING SYSTEM

(71) Applicants: Hyundai Motor Company, Seoul (KR); Kia Motors Corporation, Seoul (KR)

(72) Inventor: Dae Suk Jung, Hadong-Gun (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 295 days.

(21) Appl. No.: 15/797,989

(22) Filed: Oct. 30, 2017

(65) Prior Publication Data

US 2018/0304919 A1 Oct. 25, 2018

(30) Foreign Application Priority Data

Apr. 19, 2017 (KR) .......................... 10-2017-0050264

(51) Int. Cl.
*B62D 6/00* (2006.01)
*B62D 5/04* (2006.01)
*B62D 15/02* (2006.01)

(52) U.S. Cl.
CPC .............. *B62D 6/00* (2013.01); *B62D 5/0457* (2013.01); *B62D 5/0472* (2013.01); *B62D 15/021* (2013.01)

(58) Field of Classification Search
CPC ....... B62D 6/00; B62D 5/0457; B62D 15/021
(Continued)

(56) References Cited

U.S. PATENT DOCUMENTS 4,956,590 A * 9/1990 Phillips .................. B62D 5/008
    180/446
6,250,421 B1 * 6/2001 Poshadlo ............ B60C 23/0408
    180/446

(Continued)

FOREIGN PATENT DOCUMENTS

EP          3069959 A1 * 9/2016  ............... B62D 5/04
JP       2008-105657 A    5/2008
(Continued)

*Primary Examiner* — Tuan C To
(74) *Attorney, Agent, or Firm* — Morgan, Lewis & Bockius LLP

(57) ABSTRACT

An apparatus and method for controlling an MDPS system may include an information detection device configured to detect information for steering assistance and pull-compensation control; an MDPS basic logic device configured to determine a steering-assist control value from the detected information; a state determination device configured wherein whether conditions corresponding to a non-steering state, a straight-driving state, a deceleration state, and a state in which pulling of the vehicle occurs are satisfied is determined based on the detected information; a compensation logic device configured wherein when the conditions are satisfied, a pull-compensation control value is determined from the detected information using stored configuration information and a control target value is determined using the steering-assist control value and the pull-compensation control value; and a motor control logic device configured to control an operation of a steering motor depending on the control target value.

18 Claims, 5 Drawing Sheets

(58) Field of Classification Search
USPC .......................................................... 701/41
See application file for complete search history.

(56) References Cited

U.S. PATENT DOCUMENTS

| | | | | |
|---|---|---|---|---|
| 2004/0129490 A1* | 7/2004 | Kodama | ................ | B62D 5/008 |
| | | | | 180/402 |
| 2010/0114449 A1* | 5/2010 | Shiozawa | ................ | B60L 3/10 |
| | | | | 701/90 |
| 2012/0175183 A1* | 7/2012 | Sakaguchi | ........... | B62D 5/0472 |
| | | | | 180/446 |
| 2013/0030648 A1* | 1/2013 | Matsumoto | ........... | B60W 10/06 |
| | | | | 701/37 |
| 2013/0060427 A1* | 3/2013 | Kataoka | ............... | B62D 5/0466 |
| | | | | 701/42 |
| 2015/0321691 A1* | 11/2015 | Jang | .................... | B62D 5/0409 |
| | | | | 180/446 |
| 2016/0031477 A1* | 2/2016 | Kimpara | ............. | B62D 5/0463 |
| | | | | 701/41 |
| 2016/0101809 A1* | 4/2016 | Hong | .................. | B62D 5/0484 |
| | | | | 701/43 |
| 2017/0151979 A1* | 6/2017 | Maeda | ................ | B62D 5/0457 |
| 2017/0253265 A1* | 9/2017 | Nishimura | ............. | B62D 7/159 |
| 2017/0305455 A1* | 10/2017 | Hisanaga | ................ | B62D 6/00 |
| 2018/0134312 A1* | 5/2018 | Park | ....................... | B62D 5/008 |

FOREIGN PATENT DOCUMENTS

| | | | | | |
|---|---|---|---|---|---|
| JP | 2009-132389 A | | 6/2009 | | |
| JP | 2010195084 A | * | 9/2010 | | |
| KR | 10-2014-0081484 A | | 7/2014 | | |
| KR | 10-2014-0133319 A | | 11/2014 | | |
| KR | 10-2015-0146177 A | | 12/2015 | | |
| KR | 10-1575298 B1 | | 12/2015 | | |
| WO | WO-2014021369 A1 | * | 2/2014 | .............. | B62D 6/00 |
| WO | WO-2014156266 A1 | * | 10/2014 | .............. | B62D 5/04 |
| WO | WO-2016104427 A1 | * | 6/2016 | ........... | B62D 5/0463 |

* cited by examiner

CONTROL APPARATUS AND METHOD OF MOTOR-DRIVEN POWER STEERING SYSTEM

CROSS-REFERENCE(S) TO RELATED APPLICATIONS

The present application claims priority to Korean Patent Application No. 10-2017-0050264, filed on Apr. 19, 2017, the entire contents of which is incorporated herein for all purposes by this reference.

BACKGROUND OF THE INVENTION

Field of the Invention

The present invention relates to an apparatus and a method for controlling a motor-driven power steering (MDPS) system. More particularly, the present invention relates to an apparatus and a method for controlling a motor-driven power steering system, configured to effectively prevent a pulling of a vehicle caused by a plurality of road surface conditions during a deceleration of the vehicle in a straight-driving state and a non-steering state in which a driver does not manipulate a steering wheel.

Description of Related Art

Generally, as a representative example of a power-assisted steering system configured for reducing a driver's steering force required when the driver steers a vehicle, a Hydraulic Power Steering (HPS) system, which assists the driver's steering force using a hydraulic pressure generated by a hydraulic pump, and a Motor-Driven Power Steering System (hereinafter, abbreviated MDPS system), which assists the driver's steering force using a torque output from an electric motor, are well-known.

Here, the MDPS system is configured such that torque for assisting steering, output from an electric motor (a steering motor), is controlled depending on vehicle driving conditions when a steering-assistance function is performed in response to the manipulation of a steering wheel by a driver. Accordingly, the MDPS system provides an improved steering performance and an improved steering feel as compared to the HPS system.

Many recently developed vehicles utilize an MDPS system, which is capable of changing and controlling steering-assist force, generated from motor output torque, depending on driving conditions.

Such an MDPS system may include a controller (an MDPS ECU), a steering motor (an MDPS motor), and sensors, such as a steering angle sensor for detecting a steering angle (the angular position of a steering column) in response to the manipulation of a steering wheel by a driver, a torque sensor for detecting steering torque (steering wheel torque or column torque) input via the steering wheel, a vehicle speed sensor for detecting a vehicle speed, a wheel speed sensor, an engine RPM sensor, a yaw rate sensor, and the like.

When the MDPS system is configured as described above, the controller receives and acquires driver steering input information, such as a steering angle, a steering angular velocity, steering torque, and the like, and vehicle state information, such as a vehicle speed, a wheel speed, engine RPM, a yaw rate, and the like, from the sensors in order to control the operation and output torque of the steering motor.

Here, the steering angle indicates a position of the steering wheel. Also, the steering angular velocity may be acquired by a separate sensor or may correspond to the rotational angular velocity of the steering wheel, taken from the differential signal of a steering angle signal (a steering angle sensor signal), and the steering torque is the torque applied to the steering wheel by the driver, that is, the torque for steering.

Here, the controller controls the operation power (output) of the steering motor depending on the vehicle speed, and thereby causes torque regulated for steering assistance (hereinafter called 'assist torque') to be generated, the controller increases motor output torque at a low speed in order to help a driver easily manipulate a steering wheel, but decreases motor output torque at a high speed in order to make a driver turn the steering wheel as little as necessary, thus securing the driving stability of the vehicle.

If a steering wheel feels loose when a vehicle is driven at a high speed, even a slight turn of the steering wheel may cause a dangerous situation, and the stability of driving may be reduced. Therefore, steering assist characteristics are changed depending on the vehicle speed, so that a steering wheel is made stiff when a vehicle is driven straight ahead at a high speed, whereby more stable manipulation of the steering wheel may be achieved.

Generally, torque output from a steering motor in order to assist driver's steering force may be regulated in such a way that the controller controls a motor current to be applied to the steering motor.

Here, the controller calculates a current corresponding to an output value (an assist torque value), which is determined based on information basically collected from a vehicle, that is, based on driver steering input information and vehicle state information, applies the calculated current to the steering motor, and generates assist torque, which is torque for assisting driver's steering force, by driving the motor.

In order to deliver driver's steering force, applied via the steering wheel, and steering-assist torque generated by the motor, the above-described steering system includes components, such as a steering column installed under the steering wheel, a gearbox for converting torque, delivered from the steering column, to linear force and thereby changing the direction in which tires are configured to turn, a universal joint for delivering torque from the steering column to the gearbox, and the like.

The gearbox includes a pinion gear for receiving torque from the universal joint and a rack bar in which a rack to be engaged with the pinion gear is formed, and the rotation of the pinion gear causes the linear motion of the rack bar in the left or right direction thereof.

Here, force applied by the linear motion of the rack bar is delivered to tires via a tie road and a ball joint, whereby the tires are turned.

Meanwhile, when a driver decelerates a vehicle by stepping on a brake pedal or using an engine brake in the non-steering state in which the driver does not manipulate a steering wheel while the vehicle is driven straight ahead, a crowned road surface or a road surface having different conditions on the left and right sides may cause the vehicle to pull to one side regardless of a driver's intention, as shown in FIG. 5.

FIG. 5 shows that the direction in which a vehicle is actually proceeding may become different from the driver's desired direction thereof. That is, a vehicle may pull in a direction, other than the driver's desired direction, depending on road surface conditions during deceleration of the vehicle in a non-steering state. Accordingly, a technology for preventing a vehicle from pulling is required.

The information disclosed in this Background of the Invention section is only for enhancement of understanding of the general background of the invention and should not be taken as an acknowledgement of any form of suggestion that this information forms the prior art already known to a person skilled in the art.

BRIEF SUMMARY

The present invention has been made in an effort to solve the above-described problems associated with related art.

Various aspects of the present invention are directed to providing an apparatus and a method for controlling a motor-driven power steering system, which may effectively prevent pulling of a vehicle, caused by a plurality of road surface conditions during a deceleration of the vehicle in a straight-driving state and a non-steering state in which a driver does not manipulate a steering wheel.

Various aspects of the present invention are directed to providing an apparatus for controlling a motor-driven power steering system, which includes an information detection device configured to detect information necessary for a steering assistance and a pull-compensation control; an MDPS basic logic device configured to determine a steering-assist control value for the steering assistance from the information detected by the information detection device and output the determined steering-assist control value; a state determination device configured wherein whether conditions corresponding to a state in which a driver does not manipulate a steering wheel and the vehicle is driven straight ahead, a state in which the vehicle is being decelerated, and a state in which pulling of the vehicle occurs are satisfied is determined based on the information detected by the information detection device; a compensation logic device configured wherein when the conditions are satisfied, a pull-compensation control value is determined from the information detected by the information detection device using stored configuration information, a control target value is determined based on the steering-assist control value and the pull-compensation control value and is then output; and a motor control logic device configured to control operation of a steering motor depending on the control target value output from the compensation logic device.

A further aspect of the present invention is directed to a method for controlling a motor-driven power steering system, which includes detecting, by an information detection device, information necessary for a steering assistance and pull-compensation control in a vehicle; determining, by a controller, a steering-assist control value for steering assistance from the information detected by the information detection device; determining, by the controller, whether conditions corresponding to a state in which a driver does not manipulate a steering wheel and the vehicle is driven straight ahead, a state in which the vehicle is being decelerated, and a state in which pulling of the vehicle occurs are satisfied based on the information detected by the information detection device; when the conditions are satisfied, determining, by the controller, a pull-compensation control value from the information detected by the information detection device using stored configuration information and determining, by the controller, a control target value based on the determined steering-assist control value and pull-compensation control value; and controlling, by the controller, operation of the steering motor depending on the determined control target value.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent form or are set forth in more detail in the accompanying drawings, which are incorporated herein, and the following Detailed Description, which together server to explain certain principles of the present invention.

Figure 1:
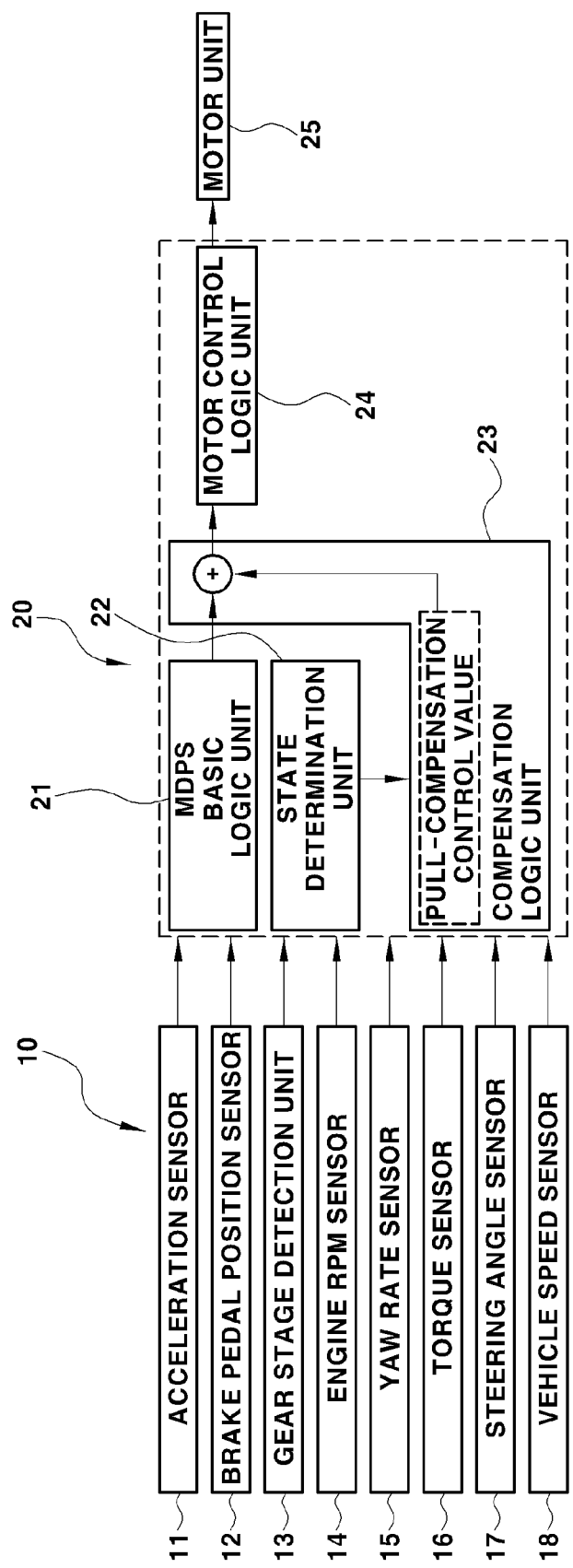
FIG. 1 is a block diagram that shows a configuration of a control apparatus according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to an apparatus and method for controlling a motor-driven power steering system, which may effectively prevent pulling of a vehicle that may occur due to a plurality of road surface conditions during deceleration of the vehicle in a state in which a driver does not manipulate a steering wheel and the vehicle is driven straight ahead.

As known, in an MDPS system, a steering-assist control value is determined using information collected from the vehicle using detectors and the like, and an operation of a steering motor is controlled using the determined steering-assist control value, wherein the steering assistance is performed.

That is, according to a basic logic of the MDPS system, a controller (MDPS ECU) is configured to determine an assist torque (or a motor current), which is a steering-assist control value based on a manipulation of the steering wheel by the driver, using the driver steering input information, including a steering angle, a steering torque, and the like, and vehicle state information, including a vehicle speed and the like, which are detected by detectors.

As such, the controller is configured to control a motor current to be applied to a steering motor using the determined steering-assist control value, and causes a torque for assisting steering, that is, a target assist torque, to be output from the actual motor.

The present invention is directed to providing a control logic configured for preventing the vehicle from pulling, and the provided control logic may be applied as the control logic of the MDPS system, along with the MDPS basic logic.

A pull-compensation control logic according to the present invention is a control logic configured for preventing pulling of the vehicle to a left or right side, which may occur due to the plurality of road surface conditions, or the like, when the vehicle is being decelerated in the state in which the driver does not manipulate the steering wheel and the vehicle is driven forwards, straight ahead.

For example, the pull-compensation control logic according to the present invention is a pull-prevention control logic which is configured to enable the vehicle to be driven straight ahead by compensating for the pulling of the vehicle during deceleration in the state in which the driver does not manipulate the steering wheel and the vehicle is driven straight ahead.

Here, the deceleration of the vehicle may indicate a situation in which the vehicle speed is decreased by a braking power generated from a brake device when the driver steps on a brake pedal, or a situation in which the driver slows down the vehicle using an engine brake.

The pulling of the vehicle that the present invention is directed to prevent may be called 'brake steer' from the aspect that pulling is a steering phenomenon that may be caused when the vehicle is being decelerated.

Also, the pull-compensation control may be called a Brake-Steer Control (BSC).

Hereinafter, an apparatus and method for controlling a motor-driven power steering system according to an exemplary embodiment of the present invention will be described in detail.

Figure 2:
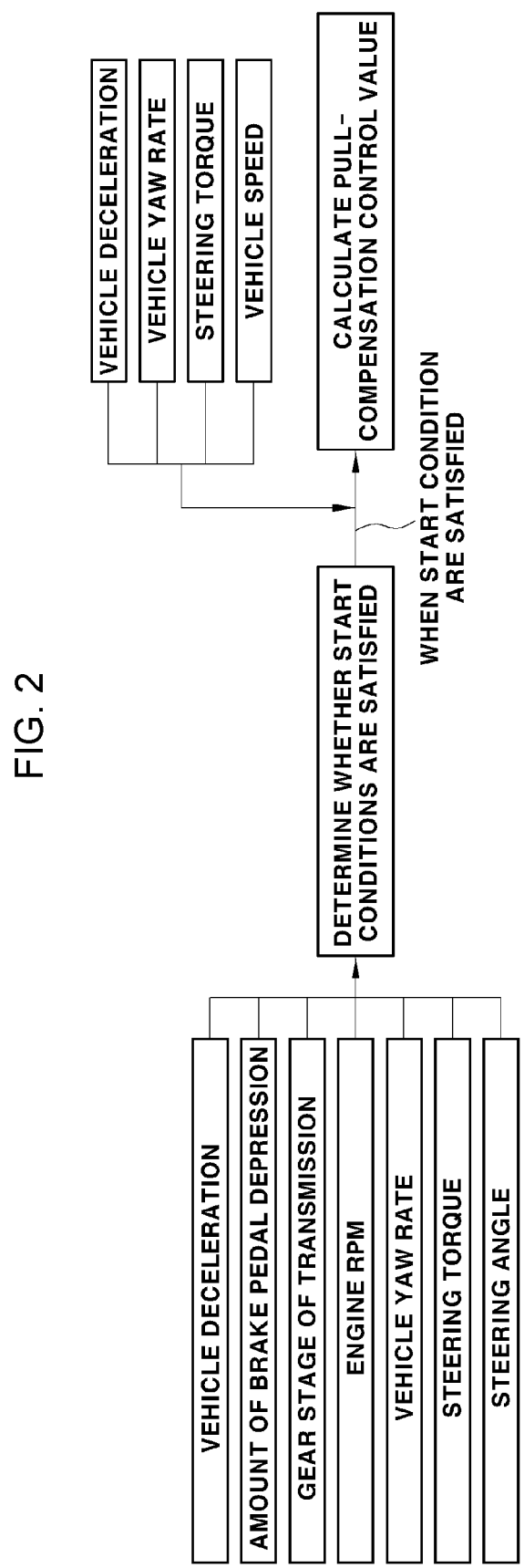
FIG. 2 is a diagram that shows information related to a plurality of variables necessary for determining a control start condition and a plurality of variables necessary for determining a pull-compensation control value in an exemplary embodiment of the present invention.

FIG. 1 is a block diagram that shows a configuration of a control apparatus according to an exemplary embodiment of the present invention, and FIG. 2 is a diagram that shows information related to a plurality of variables necessary for determining a control start condition and information related to a plurality of variables necessary for determining a pull-compensation control value in an exemplary embodiment of the present invention.

Figure 3:
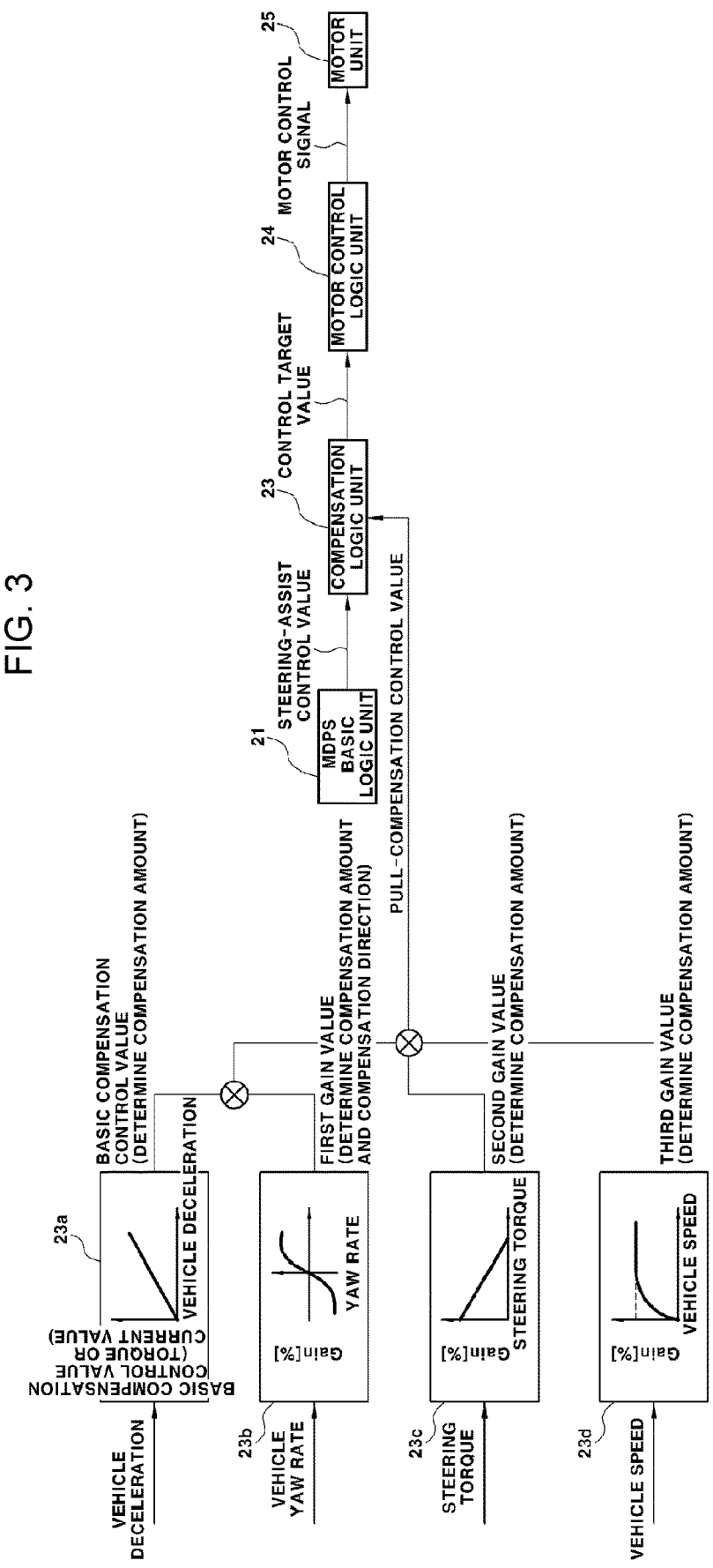
FIG. 3 is a diagram that explains a method for determining a pull-compensation control value and performing pull-compensation control in an exemplary embodiment of the present invention.

FIG. 3 is a diagram that explains a method for determining a pull-compensation control value and performing pull-compensation control in an exemplary embodiment of the present invention.

As shown in FIG. 1, an apparatus for controlling a motor-driven power steering (MDPS) system according to the present invention includes an information detection device 10 configured for detecting information necessary for steering assistance and pull-compensation control, an MDPS basic logic device 21 configured for determining a steering-assist control value using the information detected by the information detection device 10 and outputting the determined steering-assist control value, a state determination device 22 configured for determining whether conditions for starting pull-compensation control are satisfied using the information detected by the information detection device 10, a compensation logic device 23 configured for determining a pull-compensation control value using the information detected by the information detection device 10 when the conditions for starting pull-compensation control are satisfied, determining a control target value based on the steering-assist control value and the pull-compensation control value, and outputting the control target value, and a motor control logic device 24 configured for controlling an operation of a steering motor depending on the control target value output from the compensation logic device 23.

Here, the state determination device 22 and the compensation logic device 23 may be components included in the controller of the MDPS system (MDPS ECU) 20, along with the MDPS basic logic device 21 and the motor control logic device 24.

Also, the motor device 25 illustrated in FIG. 1 may include a steering motor (MDPS motor) and an inverter for driving the steering motor, and the inverter drives the steering motor by operating depending on a control signal (for example, a pulse width modulation (PWM) signal) output by the motor control logic device 24.

The MDPS basic logic device 21 determines the steering-assist control value, based on the manipulation of the steering wheel by the driver, using the driver steering input information, including the steering angle, a steering torque, and the like, and vehicle state information, including the vehicle speed and the like, which are detected by detectors within the information detection device 10.

The motor control logic device 24 outputs a control signal for controlling the current (motor current) to be applied to the steering motor, wherein the current corresponding to the control target value may be applied to the steering motor.

The steering-assist control value may be the assist torque, in which case the pull-compensation control value corresponds to the pull-compensation torque.

The control target value is a control value for controlling the steering motor, and may be a motor control value corresponding to a torque required to be output by the steering motor to compensate for pulling. Accordingly, the motor control logic device 24 outputs a control signal (control command) for causing a current corresponding to the control target value to be applied to the steering motor to control the operation of the steering motor.

Alternatively, the steering-assist control value may be a motor current, in which case the pull-compensation control value corresponds to a pull-compensation current, and the control target value may be a motor current required to be applied to the steering motor to compensate for pulling.

Accordingly, the motor control logic device 24 controls the motor current to be applied to the motor depending on the control target value, and the torque for preventing the pulling of the vehicle is output from the motor.

Meanwhile, the control apparatus according to the present invention generates the torque for preventing the pulling of the vehicle using the steering motor when pulling of the vehicle occurs during deceleration of the vehicle in the state in which the driver does not manipulate the steering wheel and the vehicle is driven straight ahead.

Figure 5:
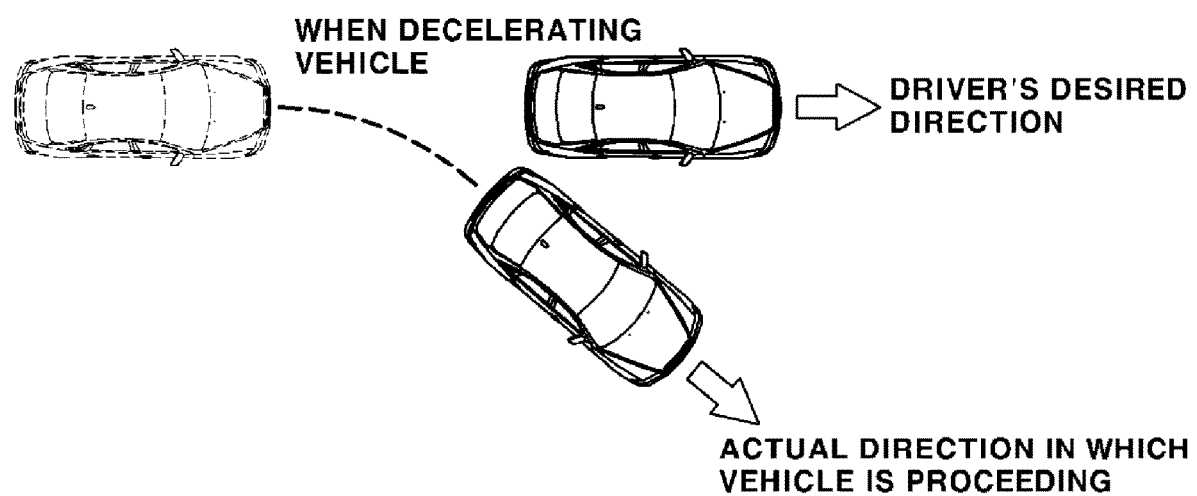
FIG. 5 is a view that shows pulling of a vehicle as a problem with a related art.

That is, when the vehicle is decelerated while the driver does not manipulate the steering wheel and maintains the steering wheel on-center, when the vehicle pulls in any one direction, other than the driver's desired direction, due to a road surface condition or the like, as shown in FIG. 5, the control apparatus controls the operation of the steering motor and causes the torque for preventing pulling of the vehicle to be output.

Accordingly, the torque output by the steering motor enables the vehicle to maintain straight ahead driving course.

As described above, the torque, output by the steering motor to prevent the vehicle from pulling, is configured as a force for forcibly and finely steering the vehicle to make the vehicle maintain straight ahead driving course when the vehicle pulls in a undesired direction, as shown in FIG. 5.

Here, the torque, output by the steering motor to prevent the vehicle from pulling, is delivered to tires via a gearbox and the like, wherein the orientation of the tires is adjusted wherein the vehicle maintains driving straight ahead, that is, the vehicle is prevented from pulling.

Also, the torque, output by the steering motor to prevent the vehicle from pulling, is the force applied to minutely turn the vehicle in the direction which is opposite to a direction in which the vehicle pulls. That is, the torque output by the steering motor adjusts the orientation of the tires wherein the orientation is opposite to the direction in which the vehicle pulls.

In the present invention, the state in which the driver manipulates the steering wheel to proceed in a desired direction is excluded from a non-steering state, but the case in which the driver unintentionally turns the steering wheel in the vicinity of an on-center position (within a predetermined range of a steering angle, for example, the steering angle which is less than 2°) may be included in the non-steering state.

Therefore, the non-steering state does not necessarily mean 0° of steering angle and 0 N·m of steering torque.

Further, when the steering angle or the steering torque is small to correspond to the non-steering state, the assist torque may be generated by the steering motor depending on the steering-assist control value determined by the MDPS basic logic device 21. Therefore, it is desirable to compensate for the assist torque using the amount of pull-compensation torque.

That is, the compensation logic device 23 determines the control target value by compensating for the steering-assist control value, determined by the MDPS basic logic device 21, using the pull-compensation control value, and the motor control logic device 24 outputs the control signal for controlling the operation of the steering motor depending on the determined control target value.

Here, the compensation logic device 23 may determine the control target value by adding the pull-compensation control value to the steering-assist control value.

The information detection device 10 may include detectors configured for detecting and collecting information required for the general steering assistance in the vehicle, and may further include components configured for detecting and collecting information required to determine the conditions for starting pull-compensation control logic and to determine the pull-compensation control value.

As the detectors for detecting and collecting information required for general steering control, the information detection device 10 may include detectors for detecting information used to determine the steering-assist control value in the MDPS basic logic device 21, that is, a steering angle detector 17 configured for detecting a steering angle in response to the manipulation of the steering wheel by the driver, a torque detector 16 configured for detecting steering torque, and a vehicle speed detector 18 configured for detecting the vehicle speed.

Also, as described above, the pull-compensation control according to the present invention is performed in the state in which the driver does not manipulate the steering wheel and the vehicle is driven straight ahead, in the deceleration state, and in the state in which pulling of the vehicle is detected. Therefore, the state determination device 22 is configured to determine whether the conditions corresponding to the state in which the driver does not manipulate the steering wheel and the vehicle is driven straight Ahead, the deceleration state, and the occurrence of pulling of the vehicle are satisfied using the information detected by the information detection device 10.

To this end, the information detection device 10 detects and collects the vehicle driving information and the vehicle state information.

That is, in the control apparatus according to the present invention, when the state determination device 22 determines that the current state corresponds to the state in which the driver does not manipulate the steering wheel and the vehicle is driven straight ahead, the state in which the vehicle is being decelerated, and the state in which pulling of the vehicle is detected, based on the vehicle driving information and the vehicle state information detected by the information detection device 10, it is determined that conditions for starting pull-compensation control logic are satisfied.

Further, when the state determination device 22 determines that the conditions for starting pull-compensation control logic are satisfied, the state determination device 22 requests the compensation logic device 23 to perform motor control to which the pull-compensation control value is applied.

In an exemplary embodiment of the present invention, the state in which the driver does not manipulate the steering wheel and the vehicle is driven straight ahead is the state in which the driver does not turn the steering wheel in any one direction and maintains the steering wheel in the vicinity of the on-center position and in which the driver's steering torque is not applied to the steering wheel.

Also, the state in which the vehicle is being decelerated is the state in which the driver is stepping on the brake pedal for braking the vehicle or in which the engine brake is operating.

Accordingly, to determine whether the driver is manipulating the steering wheel, the steering angle detector 17 for detecting the steering angle which is information indicative of the position of the steering wheel depending on the manipulation of the steering wheel by the driver, and the torque detector 16 for detecting steering torque applied to the steering wheel by the driver may be used, among the detectors of the information detection device 10.

Also, to determine whether the vehicle is decelerating, the information detection device 10 may include a Brake-pedal Position Detector (BPS) 12 configured for detecting the position of the brake pedal depending on the manipulation of the brake pedal by the driver.

Alternatively, to determine whether the vehicle is decelerating, the information detection device 10 may include a device configured for detecting the operation of the engine brake, for example, a gear stage detection device 13 configured for detecting a gear stage of a transmission and an engine RPM detector 14 configured for detecting an engine RPM.

Alternatively, to determine whether the vehicle is decelerating, the information detection device 10 may include all of the brake pedal position detector 12, the gear stage detection device 13, and the engine RPM detector 14.

Accordingly, the vehicle-driving information and the vehicle state information collected by the information detection device 10 in the vehicle may include the steering angle detected by the steering angle detector 17, the steering torque detected by the torque detector 16, the brake pedal position (the amount of brake pedal depression) detected by the brake-pedal position detector 12, information related to the gear stage detected by the gear stage detection device 13, and information related to the engine RPM detected by the engine RPM detector 14.

Additionally, to determine the pull-compensation control value, the information detection device 10 may further include an acceleration detector 11 configured for detecting a vehicle deceleration and a yaw rate detector 15 configured for detecting a vehicle yaw rate.

The acceleration detector 11 is a detector disposed in the vehicle configured to detect an acceleration and a deceleration in response to an acceleration or the deceleration of the vehicle.

Meanwhile, only when the conditions predetermined in the present invention are satisfied, the pull-compensation control logic starts, and when conditions corresponding to the state in which the driver does not manipulate the steering wheel and the vehicle is driven straight ahead, the state in which the vehicle is being decelerated, and the state in which the pulling of the vehicle is detected are satisfied as described above, the conditions for starting the pull-compensation control logic are determined to be satisfied.

Here, the control start conditions may include a condition in which the current vehicle deceleration (m/s$^2$) is greater than a predetermined deceleration, a condition in which the amount of brake pedal depression, which can be detected from the position of the brake pedal, is greater than a predetermined value, a condition in which the vehicle yaw rate (deg/s) is equal to or greater than a predetermined value, a condition in which the driver's steering torque is less than a predetermined torque, and a condition in which the steering angle is less than a predetermined angle.

Among the above-mentioned conditions, the condition in which the amount of brake pedal depression is greater than the predetermined value may be replaced by a combination of a condition in which the gear stage of the transmission is less than a predetermined stage or the number of stages by which the gear stage is shifted is greater than a predetermined number of stages and a condition in which the engine RPM is less than a predetermined RPM.

Alternatively, the control start conditions may include all of the conditions in which the amount of brake pedal depression is greater than the predetermined value, the condition in which the gear stage of the transmission is less than the predetermined stage or the number of stages by which the gear stage is shifted is greater than the predetermined number of stages, and the condition in which the engine RPM is less than the predetermined RPM.

Here, the vehicle deceleration is a vehicle state information detected by the acceleration detector 11, and a higher vehicle deceleration means that the degree of decreasing the vehicle speed is greater, and that the vehicle speed decreases more rapidly. That is, the high deceleration means a rapid decrease of the vehicle speed.

Accordingly, a deceleration greater than the predetermined deceleration means that the vehicle speed decreases more rapidly than the predetermined deceleration. Here, when an acceleration is a positive value and a deceleration is a negative value, an absolute value of the deceleration is used to represent the vehicle deceleration and the predetermined deceleration as positive values in the control start condition.

When the vehicle deceleration and the predetermined deceleration are represented as negative values when determining the control start conditions, a person skilled in the art may easily understand that the deceleration condition may be changed to a condition in which the current vehicle deceleration is less than the predetermined deceleration (for example, −10 m/s$^2$), which is a condition for determining a higher degree of a decrease of the vehicle speed).

Also, the amount of brake pedal depression is a vehicle-driving information detected by the brake pedal position detector 12, and indicates a brake pedal stroke or a brake pedal depth.

The gear stage of the transmission, the steering torque, and the steering angle are vehicle-driving information, respectively detected by the gear stage detection device 13, the torque detector 16, and the steering angle detector 17, and the vehicle yaw rate and the engine RPM are vehicle state information, respectively detected by the yaw rate detector 15 and the engine RPM detector 14.

The following Table 1 shows an exemplary embodiment of conditions for starting the pull-compensation control and conditions for cancelling the pull-compensation control.

TABLE 1

| Item | Unit (s) | Start Condition | Cancellation Condition |
|---|---|---|---|
| vehicle deceleration | m/s$^2$ | <−10 | ≥−10 |
| amount of brake pedal depression | % | >50 | ≥40 |
| gear stage of transmission | — | <3 | ≥3 |
| engine RPM | RPM | <3000 | ≥2000 |
| vehicle yaw rate | deg/s | ≥1 | <1 |
| steering torque | N · m | <1 | ≥1 |
| steering angle | deg | <2 | ≥3 |

In Table 1, a maximum value of brake pedal depression is 100, and the amount of the brake pedal depression, corresponding to the current position of the brake pedal, is defined as a percentage (%).

Referring to Table 1, the predetermined deceleration is −10 m/s$^2$, which is a negative value, and is compared with a vehicle deceleration which is acquired as a negative value.

The exemplary embodiment of Table 1 includes the condition in which the current vehicle deceleration (m/s$^2$) is less than −10 m/s$^2$ corresponding to the predetermined deceleration (the current vehicle deceleration is greater than the predetermined deceleration when the absolute values thereof are used), the condition in which the amount (%) of brake pedal depression, detected from the position of the brake pedal, is greater than 50% corresponding to the predetermined value, the condition in which the gear stage of the transmission is less than a third stage corresponding to the predetermined stage, the condition in which the engine RPM is less than 3000 RPM corresponding to the predetermined RPM, the condition in which the vehicle yaw rate (deg/s) is equal to or greater than 1 deg/s corresponding to the predetermined value, the condition in which the driver's steering torque (N·m) is less than 1 N·m corresponding to the predetermined torque, and the condition in which the steering angle (deg) is less than 2 deg corresponding to the predetermined angle.

The state determination device 22 decides whether to start control by determining the above conditions. In the present case, when all of the conditions are satisfied it is determined that the control start condition is satisfied.

Also, Table 1 shows the control cancellation conditions. To prevent frequent transition between a state satisfying the start conditions and a state satisfying the cancellation conditions, hysteresis may be determined in some of the cancellation conditions, and when any one of the cancellation conditions is satisfied, the pull-compensation control according to the present invention is cancelled.

The values shown in Table 1 are examples, and the present invention is not limited thereto. Therefore, the values may be changed or updated according to a designer.

In the above example, when the steering torque is less than the predetermined torque and when the steering angle is less than the predetermined angle, the provided indicates the state in which the driver does not manipulate the steering wheel and the vehicle is driven straight ahead, rather than the state in which the driver manipulates the steering wheel to turn the vehicle in the desired direction thereof.

That is, using the steering torque and the steering angle detected by the detectors, the state determination device 22 determines whether the current state is the state in which the driver does not manipulate the steering wheel and the vehicle is driven straight ahead.

Further, when the amount of brake pedal depression is greater than the predetermined value, the provided indicates that the vehicle is being decelerated wherein pulling of the vehicle may occur. Further, when the gear stage is less than the predetermined stage or the number of stages by which the gear stage is shifted is greater than the predetermined number of stages and when the engine RPM is less than the predetermined RPM, the provided indicates that the engine brake is being operated.

As described above, based on information related to the amount of brake pedal depression, the gear stage of the transmission, and the engine RPM, the state determination device 22 may determine whether the vehicle is being decelerated.

Further, when the vehicle yaw rate is equal to or greater than the predetermined value, the present indicates the occurrence of pulling of the vehicle, which is serious to require pull-compensation using the steering motor based on the pull-compensation control logic of the present invention.

As describe above, using information related to the vehicle yaw rate, the state determination device 22 determines whether pulling of the vehicle occurs during deceleration in the state in which the driver does not manipulate the steering wheel and the vehicle is driven straight ahead.

The compensation logic device 23 is configured to determine the pull-compensation control value based on the vehicle deceleration, the vehicle yaw rate, and the vehicle speed, corresponding to vehicle state information, and based on the steering torque, corresponding to the vehicle-driving information. Here, the pull-compensation control value may be the amount of torque or current.

Here, using stored configuration information, the compensation logic device 23 determines the pull-compensation control value depending on the vehicle deceleration, the yaw rate, the vehicle speed, and the steering torque. Here, the configuration information may be predetermined using data collected during pretesting and evaluation processes in a vehicle development step.

The configuration information may include a first configuration information 23a for determining a basic compensation control value dependent on a vehicle deceleration, a second configuration information 23b for determining a first gain value dependent on a vehicle yaw rate, a third configuration information 23c for determining a second gain value dependent on driver's steering torque, and a fourth configuration information 23d for determining a third gain value dependent on a vehicle speed.

The basic compensation control value may be the amount of torque or current, and the compensation logic device 23 may determine the final pull-compensation control value by multiplying the basic compensation control value, determined from the vehicle deceleration, by the first gain value, the second gain value, and the third gain value.

In the first configuration information 23a, as the vehicle deceleration (the absolute value thereof) is increases, that is, the degree of decrease of the vehicle speed is higher, pulling of the vehicle (the brake-steer phenomenon) becomes more serious. Accordingly, it is desirable to gradually increase the basic compensation control value (compensation torque or current) with the increase of the vehicle deceleration.

Also, the first gain value is a value for determining and applying a compensation direction, along with the compensation amount, and may be defined as a negative value or a positive value depending on whether a vehicle pulls to the left side or the right side in the second configuration information 23b.

Also, as the degree of pulling of the vehicle (brake-steer) is higher, the absolute value of the vehicle yaw rate increases. Accordingly, the absolute value of the first gain value may be defined to increase with an increase in the absolute value of the yaw rate to increase the compensation amount.

With regard to the steering torque, when the driver has no intention of manipulating the steering wheel, the compensation amount may be increased, but as the steering torque is increased, the compensation amount may be decreased. Accordingly, in the third configuration information 23c, the second gain value may be defined to decrease with an increase in the steering torque.

Also, in the fourth configuration information 23d, the greater the vehicle speed, the higher the tendency of pulling of the vehicle (break steer). Accordingly, the third gain value defined to increase with an increase in the vehicle speed. Here, in consideration of stability, the upper limit of the third gain value defined wherein the third gain value is prevented from exceeding a predetermined level.

The first to fourth configuration information 23a to 23d may be data that previously defines the relationship between the vehicle deceleration and the basic compensation control value, the relationship between the vehicle yaw rate and the first gain value, the relationship between the steering torque and the second gain value, and the relationship between the vehicle speed and the third gain value, respectively, and may be represented as maps, tables, graphs, or equations (interaction equations or relational expressions).

Also, the first gain value, the second gain value, and the third gain value may be equal to or less than 1.

FIG. 3 shows an exemplary embodiment in which a map is used for each configuration information.

When the basic compensation control value, the first gain value, the second gain value, and the third gain value are acquired using the configuration information, the multiplication thereof is defined as the pull-compensation control value (the amount of torque or current), and the compensation logic device 23 compensates for the steering-assist control value (the amount of torque or current), output from the MDPS basic logic device 21, using the pull-compensation control value and outputs the compensated control target value to the motor control logic device 24.

Accordingly, the motor control logic device 24 controls the operation of the steering motor depending on the control target value, and the steering motor outputs the torque for preventing the vehicle from pulling.

Figure 4:
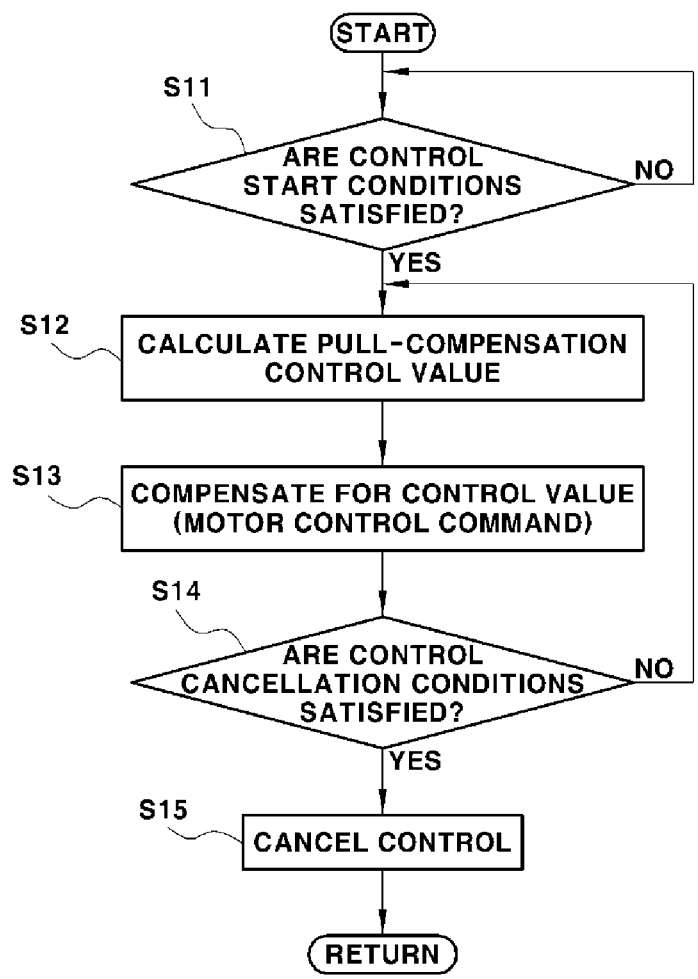
FIG. 4 is a flowchart that shows a control process according to an exemplary embodiment of the present invention.

FIG. 4 is a flowchart that shows a control process according to an exemplary embodiment of the present invention, and the control process includes a process of determining whether conditions for starting the pull-compensation control are satisfied (S11), a process of determining a pull-compensation control value when the conditions are satisfied (S12), and a processes of compensating for a steering-assist control value using the determined pull-compensation control value, generating a control signal (a motor control command) depending on the compensated control target value, and controlling the operation of the steering motor (S13).

When it is determined that a predetermined cancellation condition (reference to Table 1) is satisfied (S14), the pull-compensation control is terminated (cancelled) (S15).

According to the present invention configured as described above, pulling of the vehicle, caused due to a plurality of road surface conditions, or the like, during deceleration of the vehicle in the state in which the driver does not manipulate the steering wheel and the vehicle is driven straight ahead, may be effectively prevented, wherein a convenience of the driver and the stability of steering may be improved.

As described above, according to the apparatus and method for controlling a motor-driven power steering system, when pulling of the vehicle is detected during deceleration of the vehicle in the state in which the driver does not manipulate the steering wheel and the vehicle is driven straight ahead, the pull-compensation control value is determined using information collected from the vehicle, and the steering motor is controlled using the determined pull-compensation control value. Accordingly, pulling of the vehicle is compensated for using the torque output from the steering motor, wherein pulling of the vehicle is prevented and the convenience of the driver and the stability of steering may be improved.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described to explain certain principles of the invention and their practical application, to enable skilled in the art to make and utilize various exemplary embodiments of the present invention, as well as various alternatives and modifications thereof. It is intended that the scope of the invention be defend by the Claims appended hereto and their equivalents.

What is claimed is:

1. An apparatus for controlling a motor-driven power steering system, comprising:
    an information detection device programmed to detect information for a steering assistance and a pull-compensation control in a vehicle;
    an MDPS basic logic device programmed to determine a steering-assist control value for the steering assistance from the information detected by the information detection device;
    a state determination device programmed such that whether conditions corresponding to a state in which a driver does not manipulate a steering wheel and the vehicle is driven straight ahead, a state in which the vehicle is being decelerated, and a state in which a pulling of the vehicle occurs are satisfied, is determined based on the information detected by the information detection device;
    a compensation logic device programmed wherein, when the conditions are determined to be satisfied, a pull-compensation control value is determined from the information detected by the information detection device using stored configuration information, a control target value is determined based on the steering-assist control value and the pull-compensation control value, and the control target value is output; and
    a motor control logic device programmed to control an operation of a steering motor depending on the control target value output from the compensation logic device.

2. The apparatus of claim 1, wherein the information detection device includes:
    an acceleration detector configured for detecting a vehicle deceleration;
    a brake pedal position detector configured for detecting an amount of brake pedal depression;
    a yaw rate detector configured for detecting a vehicle yaw rate;
    a steering angle detector configured for detecting a steering angle; and
    a torque detector configured for detecting the driver's steering torque.

3. The apparatus of claim 2, wherein, when the detected vehicle deceleration is greater than a predetermined deceleration value, when the detected amount of brake pedal depression is greater than a predetermined value, when the detected vehicle yaw rate is equal to or greater than a predetermined value, when the detected driver's steering torque is less than a predetermined torque, and when the detected steering angle is less than a predetermined angle, the state determination device determines that the conditions corresponding to the state in which the driver does not manipulate the steering wheel and the vehicle is driven straight ahead, the state in which the vehicle is being decelerated, and the state in which pulling of the vehicle occurs are satisfied.

4. The apparatus of claim 1, wherein the information detection device includes:
    an acceleration detector configured for detecting a vehicle deceleration;

a gear stage detection device configured for detecting a gear stage of a transmission;

an engine revolution per minute (RPM) detector configured for detecting an engine RPM;

a yaw rate detector configured for detecting a vehicle yaw rate;

a steering angle detector configured for detecting a steering angle; and a torque detector configured for detecting the driver's steering torque.

5. The apparatus of claim 4, wherein, when the detected vehicle deceleration is greater than a predetermined deceleration, when the detected gear stage of the transmission is less than a predetermined stage or a number of stages by which a gear stage is shifted is greater than a predetermined number of stages, when the detected engine revolution per minute (RPM) is less than a predetermined RPM, when the detected vehicle yaw rate is equal to or greater than a predetermined value, when the detected driver's steering torque is less than a predetermined torque, and when the detected steering angle is less than a predetermined angle, the state determination device determines that the conditions corresponding to the state in which the driver does not manipulate the steering wheel and the vehicle is driven straight ahead, the state in which the vehicle is being decelerated, and the state in which pulling of the vehicle occurs are satisfied.

6. The apparatus of claim 1, wherein the information detection device includes:

an acceleration detector configured for detecting a vehicle deceleration;

a yaw rate detector configured for detecting a vehicle yaw rate;

a torque detector configured for detecting the driver's steering torque; and a vehicle speed detector configured for detecting a vehicle speed.

7. The apparatus of claim 6, wherein the compensation logic device is configured to determine the pull-compensation control value from the vehicle deceleration, the vehicle yaw rate, the driver's steering torque, and the vehicle speed, which are detected b the information detection device, using the configuration information.

8. The apparatus of claim 7, wherein the configuration information includes a first configuration information in which a predetermined compensation control value is defined as a value dependent on the vehicle deceleration, a second configuration information in which a first gain value is defined as a value dependent on the vehicle yaw rate, a third configuration information in which a second gain value is defined as a value dependent on the driver's steering torque, and a fourth configuration information in which a third gain value is defined as a value dependent on the vehicle speed; and wherein the compensation logic device is configured to determine the pull-compensation control value by multiplying the predetermined compensation control value by the first gain value, the second gain value and the third gain value.

9. The apparatus of claim 8, wherein in the first configuration information, the predetermined compensation control value is defined to increase with an increase in the vehicle deceleration;

wherein in the second configuration information, an absolute value of the first gain value is defined to increase with an increase in an absolute value of the vehicle yaw rate;

wherein in the third configuration information, the second gain value is defined to decrease with an increase in the driver's steering torque; and wherein in the fourth configuration information, the third gain value is defined to increase with an increase in the vehicle speed.

10. A method for controlling a motor-driven power steering system, comprising:

detecting, by an information detection device, information for a steering assistance and pull-compensation control in a vehicle;

determining, by a controller, a steering-assist control value for a steering assistance from the information detected by the information detection device;

determining, by the controller, whether a plurality of conditions corresponding to a state in which a driver does not manipulate a steering wheel and the vehicle is driven straight ahead, a state in which the vehicle is being decelerated, and a state in which pulling of the vehicle occurs are satisfied based on the information detected by the information detection device;

when the conditions are determined to be satisfied, determining, by the controller, a pull-compensation control value from the information detected by the information detection device using stored configuration information and determining, by the controller, a control target value based on the determined steering-assist control value and the determined pull-compensation control value; and controlling, by the controller, an operation of a steering motor depending on the determined control target value.

11. The method of claim 10, wherein the information for determining whether the conditions corresponding to the state in which the driver does not manipulate the steering wheel and the vehicle is driven straight ahead, the state in which the vehicle is being decelerated, and the state in which pulling of the vehicle occurs are satisfied includes a vehicle deceleration, an amount of brake pedal depression, a vehicle yaw rate, a steering angle, and the driver's steering torque.

12. The method of claim 11, wherein, when the vehicle deceleration is greater than a predetermined deceleration, when the amount of brake pedal depression is greater than a predetermined value, when the vehicle yaw rate is equal to or greater than a predetermined value, when the driver's steering torque is less than a predetermined torque, and when the steering angle is less than a predetermined angle, the controller is configured to determine that the conditions corresponding to the state in which the driver does not manipulate the steering wheel and the vehicle is driven straight ahead, the state in which the vehicle is being decelerated, and the state in which pulling of the vehicle occurs are satisfied.

13. The method of claim 10, wherein the information for determining whether the conditions corresponding to the state in which the driver does not manipulate the steering wheel and the vehicle is driven straight ahead, the state in which the vehicle is being decelerated, and the state in which pulling of the vehicle occurs are satisfied includes a vehicle deceleration, a gear stage of a transmission, an engine RPM, a vehicle yaw rate, a steering angle, and the driver's steering torque.

14. The method of claim 13, wherein, when the vehicle deceleration is greater than a predetermined deceleration, when the gear stage of the transmission is less than a predetermined stage or a number of stages by which the gear stage is shifted is greater than a predetermined number of stages, when the engine revolution per minute (RPM) is less than a predetermined RPM, when the vehicle yaw rate is equal to or greater than a predetermined value, when the driver's steering torque is less than a predetermined torque, and when the steering angle is less than a predetermined angle, the controller is configured to determine that the conditions corresponding to the state in which the driver does not manipulate the steering wheel and the vehicle is driven straight ahead, the state in which the vehicle is being decelerated, and the state in which pulling of the vehicle occurs are satisfied.

15. The method of claim 10, wherein, among the information detected by the information detection device, the information for determining the pull-compensation control value includes a vehicle deceleration, a vehicle yaw rate, the driver's steering torque, and a vehicle speed.

16. The method of claim 15,
wherein the configuration information used to determine the pull-compensation control value includes a first configuration information in which a predetermined compensation control value is defined as a value dependent on the vehicle deceleration, a second configuration information in which a first gain value is defined as a value dependent on the vehicle yaw rate, a third configuration information in which a second gain value is defined as a value dependent on the driver's steering torque, and a fourth configuration information in which a third gain value is defined as a value dependent on the vehicle speed; and
wherein the controller is configured to determine the pull-compensation control value by multiplying the predetermined compensation control value by the first gain value, the second gain value and the third gain value.

17. The method of claim 16,
wherein in the first configuration information, the predetermined compensation control value is defined to increase with an increase in the vehicle deceleration;
wherein in the second configuration information, an absolute value of the first gain value is defined to increase with an increase in an absolute value of the vehicle yaw rate;
wherein in the third configuration information, the second gain value is defined to decrease with an increase in the driver's steering torque; and
wherein in the fourth configuration information, the third gain value is defined to increase with an increase in the vehicle speed.

18. An apparatus for controlling a motor-driven power steering system, the apparatus comprising:
an information detection device configured to detect information for a steering assistance and a pull-compensation control in a vehicle, and
a controller of the motor-driven power steering system (MDPS ECU),
wherein the controller of the motor-driven power steering system comprises:
an MDPS basic logic device programmed to determine a steering-assist control value for the steering assistance from the information detected by the information detection device;
a state determination device programmed such that whether conditions corresponding to a state in which a driver does not manipulate a steering wheel and the vehicle is driven straight ahead, a state in which the vehicle is being decelerated, and a state in which a pulling of the vehicle occurs are satisfied, is determined based on the information detected by the information detection device;
a compensation logic device programmed wherein, when the conditions are determined to be satisfied, a pull-compensation control value is determined from the information detected by the information detection device using stored configuration information, a control target value is determined based on the steering-assist control value and the pull-compensation control value, and the control target value is output; and
a motor control logic device programmed to control an operation of a steering motor depending on the control target value output from the compensation logic device, wherein the information detection device includes:
an acceleration detector configured for detecting a vehicle deceleration;
a brake pedal position detector configured for detecting an amount of brake pedal depression;
a yaw rate detector configured for detecting a vehicle yaw rate;
a steering angle detector configured for detecting a steering angle; and
a torque detector configured for detecting the driver's steering torque.

* * * * *